3,268,584
HERBICIDAL α-HALOACETANILIDES
John F. Olin, Ballwin, Mo., assignor to Monsanto Company, St. Louis, Mo., a corporation of Delaware
No Drawing. Continuation of application Ser. No. 134,163, Aug. 28, 1961. This application Sept. 22, 1964, Ser. No. 398,400
3 Claims. (Cl. 260—562)

This application is a continuation of copending application Serial No. 134,163, filed August 28, 1961, now abandoned.

This invention relates to the control of plant systems, including germinating seeds, emerging seedlings, and fully developed plants. In one aspect, this invention relates to valuable herbicidal compositions. In another aspect, this invention relates to methods for destroying undesirable plant vegetation without substantially affecting desirable plant vegetation. In another aspect, this invention relates to methods for preventing the germination of seeds of undesirable plants and for preventing the growth of emerging seedlings of said plants. In another aspect, this invention relates to certain solely ortho mono-substituted N-substituted alpha-haloacetanilides as new compounds.

In recent years, the use of chemicals for affecting plant systems has found wide-spread acceptance among agriculturalists. For example, chemical compositions have been applied to fully developed vegetation to destroy the same in either a selective or non-selective manner. It is relatively easy to destroy the aerial portion of developed vegetation because the vegetation is brought into direct contact with the herbicide composition; however, it is sometimes more difficult to achieve a lethal affect on germinating seeds lying in the soil and seedlings emerging from the soil. Destruction of germinating seeds and emerging seedlings is important in preventing regrowth from the plants after the herbicide composition has either been washed away by rainfall or dissipated by other actions. Unfortunately it is usually necessary to use an excessive amount of the herbicidal composition in order to affect the germinating seeds and emerging seedlings and thereby achieve long-lasting plant control. The extended control of plant life during the growth of desirable plants is very often involved in preventing the growth of certain undesirable grasses and weeds, such as crab grass and foxtail. Obviously, a more bountiful growth of desirable grasses and crop plants will result if growth of these undesirable weeds and grasses is prevented before the soil is depleted of moisture and nutrients.

Very useful herbicidal compositions containing certain nuclear-substituted and nitrogen-substituted alpha-haloacetanilides are disclosed and claimed in U.S. Patent 2,863,752, issued to Hamm and Speziale. They discovered that the alpha-haloacetanilides required an alkyl substituent of up to 6 carbon atoms on the amide nitrogen atom and a single alkyl substituent of up to 4 carbon atoms on the aromatic ring in order to produce herbicidal activity. Even though these alpha-haloacetanilides of Hamm and Speziale are effective herbicides, it is desirable in man's continued battle with undesirable plant life to improve the effectiveness of these herbicidal compositions.

I have now discovered, much to my surprise, that the unit activity of the N-substituted alpha-haloacetanilides is increased and the plant spectrum widened at low rates of application by substituting one substituent on the aromatic ring in the ortho position with respect to the amide nitrogen atom, said ortho substituent being other than a tertiary alkyl group, and not substituting any other substituents on the aromatic ring.

An object of this invention is to provide novel herbicidal compositions containing as an essential ingredient a N-substituted alpha-haloacetanilide having but one ortho non-tertiary substituent.

Another object of this invention is to provide novel herbicidal compositions having a high unit activity and a wide plant spectrum at low rates of application.

Another object of this invention is to provide novel herbicidal compositions useful for soil sterilization at low rates of application.

Another object of this invention is to provide novel herbicidal compositions which exhibit selectivity in affecting certain undesirable plant systems without affecting desirable plant systems.

Another object of this invention is to provide methods for the suppression and control of vegetation.

Another object of this invention is to provide methods for the suppression and control of undesirable vegetation growing inter-mingled with desirable vegetation.

Another object of this invention is to provide methods for preventing the germination of seeds of undesirable plants and for preventing the growth of undesirable emerging seedlings in soil which is planted with seeds of desirable vegetation.

Another object of this invention is to provide as new compounds certain N-substituted alpha-haloacetanilides having a single non-tertiary ortho substituent.

Other aspects, objects, and advantages of this invention will be apparent from a consideration of the accompanying disclosure and the appended claims.

According to the present invention, there are provided herbicidal concentrate compositions comprising a herbicide adjuvant and an alpha-haloacetanilide of the formula

wherein $R_1$ is an alkyl radical, $R_2$ is selected from the group consisting of primary alkyl, secondary alkyl, and alkoxy radicals, and X is a halogen atom selected from the group consisting of chlorine and bromine, but X is only chlorine when $R_1$ is tert-alkyl and $R_2$ is selected from the group consisting of primary alkyl and secondary alkyl.

Also, according to the present invention, there are provided herbicidal compositions comprising a carrier, a herbicide adjuvant and a toxic or growth-inhibiting amount of an alpha-haloactanilide of the formula as described above.

Also, according to the present invention, there are provided methods for affecting plant systems, including fully developed vegetation as well as germinating seeds and emerging plant seedlings, in a manner to destroy said vegetation and to prevent the growth of said seeds and said emerging seedlings by the application of a toxic or growth-inhibiting amount of an alpha-haloacetanilide of the formula as described above.

Further, according to the present invention, there are provided as new compounds, alpha-haloacetanilides of the formula as described above.

The alpha-haloacetanilides of this invention have a substituent substituted on the amide nitrogen atom and a single substituent on the aromatic ring ortho with respect to the amide nitrogen atom. There are no other substituents on the aromatic ring. The nitrogen substituent, $R_1$ in the formula above, is an alkyl radical. This alkyl radical may have either a straight chain or a branched chain configuration, including secondary and tertiary alkyl groups. Preferably, this alkyl radical has not more than 6 carbon atoms. Examples of suitable alkyl radicals include methyl, ethyl, isopropyl, n-butyl, sec-butyl, tert-butyl, n-amyl, tert-amyl, n-hexyl, and the like.

The ortho substituent, $R_2$ in the formula above, may be either a primary alkyl, secondary alkyl, or alkoxy radical. Preferably, this radical has not more than 4 carbon atoms. Examples of some suitable primary and secondary alkyl radicals include methyl, ethyl, n-propyl, isopropyl, n-butyl, and iso-butyl. Examples of some suitable alkoxy radicals include methoxy, ethoxy, propoxy, butoxy and the like.

The alpha-haloacetanilides of this invention may in general be prepared by haloacetylation of suitable N- substituted and ortho-substituted aromatic amines, which may be prepared for example, by the process disclosed in application S.N. 824,455, filed July 2, 1959, now abandoned, from a primary aromatic amine and a branch-chain olefin. The haloacetylating agent is preferably either a haloacetic anhydride, such as chloroacetic anhydride, or a haloacetyl halide, such as chloroacetyl chloride, bromoacetyl bromide, or the like.

The haloacetylation reaction is preferably conducted in the presence of a suitable liquid reaction medium. The liquid reaction medium must be anhydrous if the acetylating agent is a haloacetic anhydride; however, either anhydrous reaction mediums or mediums containing water can be used with haloacetyl halide acetylating agents. Examples of some suitable reaction mediums for use with either acetylating agent include benzene, diethyl ether, hexane, methylethyl ketone, chlorobenzene, toluene, chloroform, and the xylenes. Since an acid or hydrogen halide is eliminated in the halo-acetylation reaction, it is also desirable to have an acid acceptor present in the reaction zone to neutralize the acid formed. Suitable acid acceptors for anhydrous solvent systems include the N-substituted ortho-substituted aromatic amine reactants, which may be present in the reaction zone in an amount greater than that required for the acetylation, tertiary amines, and pyridine. Acid acceptors in aqueous solvent systems include alkali or alkaline earth hydroxides and alkali or alkaline earth metal carbonates or bicarbonates.

The haloacetylation reaction is generally carried out at a temperature which is below room temperature, preferably in the range of from 0° C. to 15° C. It is not usually desirable to carry out the reaction at a temperature above room temperature because hydrolysis of the haloacetyl halide takes place and the reaction rate is excessively high. It is generally preferable to carry out the reaction at atmospheric pressure although sub-atmospheric pressure and super-atmospheric pressure can be used. Although the haloacetylation reaction can be carried out using stoichiometric amounts of reactants, it is usually preferable to use from 2 to 5% of an excess of the acetylating agent. The acetanilide products may be separated from the reaction mixture by methods well known to those skilled in the art, such as by distillation or by fractional crystallization from the reaction medium or from solvents in case the desired product is a soluble substance.

The advantages, desirability and usefulness of the present invention are illustrated by the following examples.

EXAMPLE 1

In this example, N-tert-butyl-2-chloro-2'-methylacetanilide was prepared by heating 49 g. (0.33 mole) of N-tert-butyl-2-methylaniline, (0.33 mole) of chloroacetic anhydride, and 100 ml. of chloroform under reflux for a period of 10 minutes. The reaction mixtures was evaporated overnight under a hood and the residue obtained first washed with water and then with dilute potassium carbonate. Upon distillation there was obtained a fraction boiling at 138–139° C. Crystallization of the product from heptane gave 42 g. of the N-tert-butyl-2-chloro-2'-methylacetanilide which is a colorless solid having a melting point of 47.7–48.4° C. Analysis of the product was found to be 14.72% chlorine as compared with the calculated value of 14.79% chlorine.

EXAMPLE 2

In this example, 2-chloro-N,2'-di-(1 - methylpropyl)-acetanilide was prepared from N,2-di-(1-methylpropyl)-aniline and chloroacetyl chloride. Into a reaction flask were placed 33 g. (0.16 mole) of N,2-di - (1 - methylpropyl)aniline, 100 ml. of toluene, 100 ml. of water, 250 g. of ice and 20 g. of sodium bicarbonate. Thereafter, 20 g. of chloroacetyl chloride in 50 ml. of toluene was added to the reaction with stirring over a period of 25 minutes while maintaining the temperature at —2° C. by external cooling. Upon completion of the addition of the chloroacetyl chloride, the reaction mixture was stirred an additional 15 minutes. At the end of this time, the solvents were removed under vacuum and the residue extracted with diethyl ether. The extract obtained was washed with water and distilled to obtain 37 g. of 2-chloro-N,2'-di-(1-methylpropyl)acetanilide which is a light straw colored liquid boiling at 204–207° C./17 mm. Hg and having a refractive index $n_D^{25}$ 1.5229.

EXAMPLE 3

In this example, N-tert-butyl-2-chloro-2'-ethylacetaniline was prepared by heating 35.4 g. (0.2 mole) of N-tert-butyl-2-ethylaniline and 0.21 mole of chloroacetic anhydride in chloroform under reflux for a period of 15 minutes. After standing overnight, the reaction mixture was washed with warm water, washed with dilute potassium carbonate, and distilled. From the distillation there was obtained 42 g. of N-tert-butyl-2-chloro-2'-ethylacetanilide which is a light straw colored liquid boiling at 183–187° C./17 mm. Hg and having a refractive index $n_D^{25}$ 1.5270. Analysis of the product was found to be 13.57% chlorine as compared with the calculated value of 13.97% chlorine.

EXAMPLE 4

In this example, 2-chloro-N-isopropyl-2'-methylacetanilide was prepared by heating 59 g. (0.4 mole) of N-isopropyl-2-methylaniline dissolved in 100 ml. of benzene with 0.44 mole of chloroacetic anhydride in chloroform. After the vigorous exothermic reaction had subsided, the reaction mixture was permitted to stand for 15 minutes and then 100 ml. of water added. Thereafter, the solvents were removed by distillation and the remaining reaction mixture washed with water and distilled under vacuum to obtain a fraction boiling at 102–105° C./0.25 mm. Hg. Crystallization was effected on cooling to obtain 74 g. of the 2-chloro-N-isopropyl-2'-methylacetanilide which is a colorless solid having a melting point of 40–41.5° C.

Analysis of the product was found to be 15.57% chlorine as compared with the calculated value of 15.78% chlorine.

EXAMPLE 5

In this example, 2-chloro-2'-methyl-N - (1 - methylpropyl) acetanilide was prepared from N-(1 - methylpropyl)-2-methylaniline and chloroacetyl chloride. Into a 2-liter reaction flask were placed 82 g. (0.5 mole) of N-(1-methylpropyl)-2-methylaniline, 300 ml. benzene, 100 ml. of diethyl ether, 100 g. of potassium carbonate, 100 g. of water, and 500 g. of ice. Thereafter, 66 g. (0.58 mole) of chloroacetyl chloride in 50 ml. of benzene was added slowly with stirring over a period of 45 minutes while maintaining a temperature in the range of −5° to +5° C. by external cooling. Thereafter, separation of the reaction mixture was effected and the oil layer removed, washed with water, and evaporated to remove the solvents. Distillation was then effected to obtain 99 g. of the 2-chloro-2'-methyl-N-(1 - methylpropyl)acetanilide which is a colorless liquid having a boiling point of 154–158° C./4 mm. Hg and a refractive index $n_D^{25}$ 1.5310. Analysis of the product was found to be 14.94% chlorine as compared with the calculated value of 14.79% chlorine.

EXAMPLE 6

In this example, 2-chloro-2'-ethyl-N-isopropyl-acetanilide was prepared from 2-ethyl-N - isopropylaniline and chloroacetyl chloride. Into a 2-liter reaction flask were placed 82 g. (0.5 mole) of 2-ethyl-N-isopropylaniline, 200 ml. benzene, 100 ml. diethyl ether, 100 g. of potassium carbonate, 100 g. of water and 400 g. of ice. Thereafter, 62 g. (0.55 mole) of chloroacetyl chloride in 50 ml. of benzene was added slowly with stirring over a period of 30 minutes. Thereafter, separation of the reaction mixture was effected and the oil layer recovered, washed with water, and evaporated. The thin syrup produced was distilled to obtain a fraction boiling at 159–161° C./4.3 mm. Hg. Crystallization of the product was effected by cooling. The product was recrystallized by dissolving in 200 ml. of hexane and cooling to obtain 98 g. of 2-chloro-2'-ethyl-N-isopropyl-acetanilide which is a colorless solid having a melting point of 38–40° C. Analysis of the product was found to be 14.68% chlorine as compared with a calculated value of 14.79% chlorine.

EXAMPLE 7

In this example, 2-chloro-2'-ethyl-N-(1-methylpropyl)-acetanilide was prepared from 2-ethyl-N-(1-methylpropyl)aniline and chloroacetyl chloride. Into a 2-liter reaction flask were placed 89 g. (0.5 mole) of 2-ethyl-N-(1-methylpropyl)aniline, 200 ml. of benzene, 100 ml. of diethyl ether, 100 g. of potassium carbonate, 100 g. of water and 400 g. of ice. Thereafter , 62 g. (0.55 mole) of chloroacetyl chloride in 50 ml. of benzene was added slowly over a period of 30 minutes. Phase separation of the reaction mixture was effected and the oil layer washed with water, evaporated and distilled to obtain 84 g. of the 2-chloro-2'-ethyl-N-(1-methylpropyl)acetanilide which is a colorless liquid having a melting point of 115–120° C./0.12 mm. Hg and a refractive index $n_D^{25}$ 1.5285. Analysis of the product was found to be 13.91% chlorine as compared with the calculated value of 13.97% chlorine.

EXAMPLE 8

In this example, 2-chloro-2'-isopropyl-N-methylacetanilide was prepared by heating 20 g. (0.2 mole) of N-methyl-2-isopropylaniline in 100 ml. of benzene with an excess of chloroacetic anhydride in chloroform for a period of 10 minutes. Thereafter, 250 ml. of water was added and the solvents removed by distillation. Crystallization of the product from dilute methanol was effected to obtain 35 g. of 2-chloro-2'-isopropyl-N-methylacetanilide which is a colorless solid having a melting point 98.5–98° C. Analysis of the product was found to be 15.06% chlorine as compared with a calculated value of 15.71% chlorine.

EXAMPLE 9

In this example, N-tert-amyl-2-chloro-2'-methylacetanilide was prepared by heating 20 g. (0.11 mole) of N-tert-amyl-2-methylaniline dissolved in 50 ml. of benzene with 23.8 g. (0.14 mole) of chloroacetic anhydride. The mixture of reactants was heated on a hot plate for 15 minutes and then the solids were removed by evaporation. The remaining reaction material was taken up in diethyl ether and washed first with water, then with dilute potassium carbonate solution, and finally with water. Distillation of the oil obtained was effected to produce 17.5 g. of the N-tert-amyl-2-chloro-2(-methylacetanilide which is an amber colored oil having a boiling point of 149–151° C./1.5 mm. Hg and a refractive index $n_D^{25}$ 1.5309. Analysis of the product was found to be 14.19% chlorine as compared with the calculated value of 13.97% chlorine.

EXAMPLE 10

In this example, 2-chloro-N-ethyl-2'-methylacetanilide was prepared from N-ethyl-2-methylaniline and chloroacetyl chloride. Into a 2-liter reaction flask were placed 135 g. (1 mole) of N-ethyl-2-methylaniline, 200 g. of benzene, 138 g. of potassium carbonate, 200 g. of water, and 200 g. of ice. Thereafter, 116 g. (1.025 moles) of chloroacetyl chloride was added slowly over a period of 75 minutes. Upon completion of the addition of the chloroacetyl chloride, the reaction mixture was heated at a temperature of 40° C. for an additional 10 minutes. Phase separation of the reaction mixture was effected to obtain an oil layer which was washed with 800 ml. of warm water and distilled under vacuum to obtain a fraction boiling at 140–143° C./2 mm. Hg. This fraction was redistilled to obtain 146 g. of 2-chloro-N-ethyl-2'-methylacetanilide which is a pale straw colored liquid having a boiling point of 134–136° C./1.0 mm. Hg and a refractive index $n_D^{25}$ 1.5380.

EXAMPLE 11

In this example, 2-chloro-N,2'-dimethylacetanilide was prepared from N,2-dimethylaniline and chloroacetyl chloride. Into a 500 ml. reaction flask were placed 12.5 g. (0.1 mole) of N,2-dimethylaniline, 12 g. of potassium carbonate, 35 ml. of water, 100 g. of ice, and 100 g. of heptane. Thereafter, 12 g. of chloroacetyl chloride in 25 ml. of heptane was added slowly with stirring over a 10 minute period while maintaining the temperature at 0–5° C. Upon completion of the addition of the chloroacetyl chloride, the reaction mixture was stirred for an additional 10 minutes. At the end of this time, water and diethyl ether was added to effect phase separation. The oil layer was separated, washed with diethyl ether, and evaporated on a hot plate to remove the water. Addition diethyl ether was added and crystallization effected by cooling to obtain 15 g. of the 2-chloro-N-2'-dimethylacetanilide which is a gray-white colored solid material having a melting point of 43.5–44.5° C.

EXAMPLE 12

In this example, 2-bromo-N,2'-dimethylacetanilide was prepared from N,2-dimethylaniline and bromoacetyl bromide. Into a 500 ml. reaction flask were placed 12.5 g. of N,2-dimethylaniline, 12 g. of potassium carbonate, 35 ml. of water, 100 g. of ice, and 100 g. of heptane. Thereafter, 20.2 g. of bromoacetyl bromide and 25 ml.

of heptane was added slowly over a period of 10 minutes while maintaining the reaction temperature at 0–5° C. Upon completion of the addition of the bromoacetyl bromide, the reaction mixture was stirred for an additional 10 minutes. At the end of this time, phase separation of the reaction mixture was effected by the addition of water and diethyl ether. The oil layer was recovered, washed with diethyl ether, and evaporated to remove traces of water. The residue was taken up in a mixture of hexane and diethyl ether and washed first with warm dilute hydrochloric acid and then twice with water. Distillation of this material gave 19 g. of the 2-bromo-N,2'-dimethylacetanilide which is an amber colored oil boiling at 80° C./0.1 mm. Hg and having a refractive index $n_D^{25}$ 1.5641. Analysis of this product was found to be 33.21% bromine as compared with the calculated value of 33.01% bromine.

EXAMPLE 13

In this example, N-tert-butyl-2-chloro-2'-methoxyacetanilide was prepared from N-tert-butyl-2-methoxyaniline and chloroacetyl chloride. Into a reaction flask were placed 35.9 g. (0.2 mole) of N-tert-butyl-2-methoxyaniline and 100 g. of heptane. The contents of the reaction flask were heated under reflux to a temperature of 90° C. Thereafter, 25 g. of chloroacetyl chloride was added over a 10 minute period and the reaction mixture heated under reflux for a period of 1.5 hours. At the end of this time, crystallization of the product was effected by cooling and the product recovered by filtration, followed by washing with pentane. The amount of N-tert-butyl-2-chloro-2-methoxyacetanilide recovered was 40 g. This product is a cream colored solid material having a melting point of 74–76° C. Analysis of the product was found to be 14.15% chlorine as compared with the calculated value of 13.86% chlorine.

EXAMPLE 14

In this example, 2-bromo-N-tert-butyl-2'-methoxyacetanilide was prepared from N-tert-butyl-2-methoxyaniline and bromoacetyl bromide. Into a reaction flask were placed 36 g. of N-tert-butyl-2-methoxyaniline, 150 g. of benzene, 25 g. of potassium carbonate, and 150 g. of water. Thereafter, 41 g. of bromoacetyl bromide in 50 ml. of benzene was added slowly with stirring over a period of time of 20 minutes while maintaining the temperature at 5–15° C. Upon completion of the addition of the bromoacetyl bromide, the reaction mixture was heated for an additional 15 minutes. At the end of this time, the reaction mixture was washed first with water, then with dilute hydrochloric acid, and finally 2 times with water. After filtration, the colorless oil obtained was evaporated under a hood and the residue obtained dissolved in hot heptane. Crystallization was effected by cooling the heptane solution and the product recovered by filtration and washing with cold pentane. The product, 2-bromo-N-tert-butyl-2'-methoxyanilide, was obtained in an amount of 52 g. as a sandy white solid material having melting point of 67–69° C. Analysis of the product was found to be 26.61% bromine as compared with the calculated value of 26.62% bromine.

EXAMPLE 15

In this example, the pre-emergent herbicidal ratings of some of the N-substituted ortho-substituted alpha-haloacetanilides of this invention were determined in greenhouse tests in which a specific number of seeds of 12 different plants, each representing a principal botanical type, were planted in greenhouse flats. A good grade of top soil was placed in either 9½" x 5¾" x 2¾" or 9" x 13" x 2" aluminum pans and compacted to a depth of ⅜ inch from the top of the pan. On top of the soil were placed five seeds of each of radish, morning glory, and tomato; 10 seeds of each of sugar beet, sorghum, and brome grass; 20 seeds of each of wild buckwheat, giant foxtail, rye grass, and wild oat; approximately 20 to 30 (a volume measure) of each of pigweed and crab grass; and either 2 or 3 seeds of soybean. Two different type plantings were made; one wherein the herbicidal composition was applied to the surface of the soil and the other wherein the composition was admixed with or incorporated in the top layer of soil. In the surface application plantings, the seeds were arranged with 3 soybean seeds across the center of the large aluminum pan, the monocotyledon or grass seeds scattered randomly over one-third of the soil surface, and the dicotyledon or broadleaf seeds scattered randomly over the remaining one-third of the soil surface at the other end of the pan. The seeds were then covered with ⅜ inch of prepared soil mixture and the pan leveled. In the soil-incorporation plantings, 450 g. of prepared soil mixture was blended with the herbicide composition in a separate mixing container for covering the seeds which were planted in the smaller of the two aluminum pans. The seeds in this planting were arranged with a soybean seed planted in diagonal corners and the monocotyledon seeds and the dicotyledon seeds each scattered randomly over one-half of the soil surface. The herbicide-incorporated soil mixture was used to cover the seeds. The herbicide composition was applied in the surface-application plantings prior to the watering of the seeds. This application of the herbicide composition was made by spraying the surface of the soil with an acetone solution containing a sufficient quantity of the candidate chemical to obtain the desired rate per acre on the soil surface. The watering of the seeds in both type plantings was accomplished by placing the aluminum pans in a sand bench having ½-inch depth of water thereon and permitting the soil in the pans to absorb moisture through the perforated bottom of the pans.

The planted pans were thereafter placed on a wet sand bench in a greenhouse and maintained there for 14 days under ordinary conditions of sunlight and watering. At the end of this time, the plants were observed and the results recorded by counting the number of plants of each species which germinated and grew. The herbicidal rating was obtained by means of a fixed scale based on the average percent germination of each seed lot. The herbicidal ratings are defined as follows:

0 _____ No phytotoxicity.
1 _____ Slight phytotoxicity.
2 _____ Moderate phytotoxicity.
3 _____ Severe phytotoxicity.

The pre-emergent herbicidal activity of som eof the N-substituted ortho-substituted alpha-haloacetanilides of this invention are recorded in Table I for various application rates of the alpha-haloacetanilide in both surface and soil-incorporated applications. In Table I, the various seeds are represented by letters as follows:

A _____ General grass.
B _____ General broadleaf.
C _____ Morning glory.
D _____ Wild oats.
E _____ Bromegrass.
F _____ Ryegrass.
G _____ Radish.
H _____ Sugar beet.
I _____ Foxtail.
J _____ Crabgrass.
K _____ Pigweed.
L _____ Soybean.
M _____ Wild buckwheat.
N _____ Tomato.
O _____ Sorghum.

Individual injury ratings for each plant type are reported in Table I. In addition, the total injury rating for all grass plants and the total injury rating for all broadleaf plants are also reported in Table I. For grasses, the maximum total is 18 for the 6 grass plants at ratings of 3. For broadleafs, the maximum total is 21 for the 7 broadleaf plants at ratings of 3.

of grasses effectively controlled by the N-substituted ortho-substituted alpha-haloacetanilides of this invention embrace a large number of undesirable plants, or weeds, frequently found in vegetable crops. But these N-substituted ortho-substituted alpha-haloacetanilides are not limited to removing grasses from broadleaf plants, since the selective action is such that certain genera of grasses

*Table I*

PRE-EMERGENCE HERBICIDAL ACTIVITY OF THE N-SUBSTITUTED ORTHO-SUBSTITUTED ALPHA-HALOACETANILIDE

| Compound | Rate, lb./acre | A | B | C | D | E | F | G | H | I | J | K | L | M | N | O | Total Injury Rating Grass | Total Injury Rating Broadleaf | Comments |
|---|---|---|---|---|---|---|---|---|---|---|---|---|---|---|---|---|---|---|---|
| N-tert-butyl-2-chloro-2'-methylacetanilide. | 25 | 3 | 3 | 3 | 3 | 3 | 3 | 3 | 3 | 3 | 3 | 3 | 2 | 3 | 3 | 3 | 18 | 20 | (1) |
|  | 5 | 3 | 3 | 3 | 3 | 3 | 3 | 2 | 2 | 3 | 3 | 3 | 2 | ---- | 3 | 3 | 18 | *15 | (2) |
|  | 1 | 3 | 2 | 3 | 0 | 3 | 3 | 1 | 2 | 3 | 3 | 3 | 2 | 1 | 2 | 3 | 15 | 14 | (2) |
|  | 0.15 | 2 | 0 | 0 | 0 | 0 | 3 | 0 | 0 | 3 | 3 | 3 | 0 | ---- | 0 | 0 | 9 | *3 | (2) |
| 2-chloro-N,2'-di-(1-methylpropyl)-acetanilide. | 25 | 3 | 2 | 2 | 3 | 3 | 3 | 1 | 2 | 3 | 3 | 3 | 1 | 0 | 1 | 3 | 18 | 10 | (1) |
|  | 5 | 3 | 0 | 0 | 0 | 3 | 3 | 0 | 0 | 3 | 3 | 2 | 0 | ---- | 0 | 3 | 15 | *2 | (2) |
|  | 1 | 2 | 0 | 1 | 0 | 3 | 3 | 0 | 0 | 2 | 3 | 3 | 0 | ---- | 0 | 1 | 12 | *4 | (2) |
| N-tert-butyl-2-chloro-2'-ethylacetanilide. | 25 | 3 | 3 | 3 | 3 | 3 | 3 | 3 | 3 | 3 | 3 | 3 | 2 | 3 | 3 | 3 | 18 | *20 | (1) |
|  | 5 | 3 | 2 | 3 | 2 | 3 | 3 | 1 | 2 | 3 | 3 | 3 | 1 | ---- | 0 | 3 | 17 | *10 | (2) |
|  | 1 | 2 | 0 | 1 | 0 | 1 | 3 | 0 | 1 | 3 | 2 | 2 | 0 | ---- | 0 | 1 | 10 | *4 | (2) |
| 2-chloro-N-isopropyl-2'-methylacetanilide. | 25 | 3 | 3 | 3 | 3 | 3 | 3 | 2 | 3 | 3 | 3 | 3 | 1 | ---- | 3 | 3 | 18 | *15 | (1) |
|  | 5 | 3 | 3 | 3 | 2 | 3 | 3 | 1 | 3 | 3 | 3 | 3 | 1 | ---- | 1 | 3 | 17 | *12 | (1) |
|  | 1 | 3 | 0 | 0 | 3 | 3 | 3 | 0 | 0 | 3 | 3 | 3 | 1 | 0 | 0 | 3 | 18 | 4 | (2) |
|  | 0.25 | 2 | 0 | 0 | 0 | 1 | 2 | 0 | 0 | 3 | 3 | 1 | 0 | 0 | 0 | 0 | 9 | 1 | (2) |
| 2-chloro-2'-methyl-N-(1-methylpropyl)-acetanilide. | 5 | 2 | 1 | 0 | 0 | 0 | 3 | 0 | 0 | 3 | 3 | 3 | 0 | 3 | 0 | 0 | 9 | 6 | (1) |
|  | 1 | 2 | 0 | 0 | 0 | 3 | 3 | 0 | 0 | 3 | 3 | 3 | 0 | 0 | 0 | 0 | 12 | 3 | (2) |
| 2-chloro-2'-ethyl-N-isopropyl-acetanilide. | 5 | 3 | 1 | 0 | 3 | 3 | 3 | 0 | 0 | 3 | 3 | 3 | 0 | 3 | 0 | 2 | 17 | 6 | (1) |
|  | 1 | 3 | 0 | 0 | 2 | 3 | 3 | 0 | 0 | 3 | 3 | 3 | 0 | 3 | 0 | 3 | 17 | 3 | (2) |
|  | 0.25 | 2 | 0 | 0 | 0 | 2 | 3 | 0 | 0 | 3 | 3 | 1 | 0 | 0 | 0 | 0 | 11 | 1 | (2) |
| 2-chloro-2'-ethyl-N-(1-methylpropyl)-acetanilide. | 5 | 3 | 1 | 0 | 2 | 3 | 3 | 0 | 0 | 3 | 3 | 3 | 0 | 3 | 0 | 0 | 14 | 6 | (1) |
| 2-chloro-2'-isopropyl-N-methyl-acetanilide. | 5 | 3 | 1 | 2 | 3 | 3 | 3 | 1 | 2 | 3 | 3 | 3 | 0 | ---- | 0 | 2 | 17 | *8 | (1) |
|  | 1 | 3 | 0 | 0 | 3 | 3 | 3 | 0 | 1 | 3 | 3 | 3 | 0 | 0 | 0 | 0 | 15 | 4 | (2) |
|  | 0.25 | 2 | 0 | 0 | 0 | 2 | 3 | 0 | 0 | 3 | 3 | 0 | 0 | 0 | 0 | 0 | 11 | 0 | (2) |
| N-tert-amyl-2-chloro-2'-methylacetanilide. | 5 | 3 | 3 | 3 | 3 | 3 | 3 | 1 | 1 | 3 | 3 | 3 | 3 | 2 | 3 | 3 | 18 | 16 | (1) |
|  | 1 | 3 | 0 | 0 | 2 | 3 | 3 | 0 | 0 | 3 | 3 | 1 | 1 | 0 | 0 | 2 | 16 | 2 | (1) |
| 2-chloro-N-ethyl-2'-methyl-acetanilide. | 5 | 3 | 0 | 0 | 3 | 3 | 3 | 0 | 1 | 3 | 3 | 3 | 0 | 0 | 1 | 3 | 18 | 5 | (1) |
|  | 1 | 3 | 1 | 3 | 3 | 3 | 3 | 0 | 0 | 3 | 3 | 3 | 0 | 0 | 0 | 3 | 18 | 6 | (2) |
|  | 0.10 | 3 | 0 | 0 | 2 | 2 | 3 | 0 | 0 | 3 | 3 | 0 | 0 | 0 | 0 | 2 | 15 | 0 | (2) |
| 2-chloro-N,2'-dimethylacetanilide. | 5 | 3 | 2 | 0 | 2 | 3 | 3 | 1 | 1 | 3 | 3 | 3 | 3 | 1 | 2 | 3 | 17 | 11 | (1) |
|  | 1 | 3 | 0 | 0 | 3 | 3 | 3 | 0 | 0 | 3 | 3 | 2 | 0 | 0 | 0 | 2 | 17 | 2 | (2) |
|  | 0.25 | 3 | 0 | 0 | 3 | 3 | 3 | 0 | 0 | 3 | 3 | 2 | 0 | 1 | 0 | 0 | 15 | 3 | (2) |
|  | 0.05 | 3 | 0 | 0 | 3 | 3 | 3 | 0 | 0 | 3 | 2 | 0 | 0 | 0 | 0 | 0 | 14 | 0 | (2) |
| 2-bromo-N,2'-dimethylacetanilide. | 5 | 3 | 2 | 0 | 2 | 3 | 3 | 2 | 3 | 3 | 3 | 3 | 0 | 1 | 1 | 1 | 15 | 10 | (1) |
| N-tert-butyl-2-chloro-2'-methoxyacetanilide. | 5 | 3 | 1 | 3 | 3 | 1 | 3 | 0 | 0 | 3 | 3 | 3 | 1 | 0 | 0 | 3 | 16 | 7 | (1) |
|  | 1 | 2 | 0 | 0 | 0 | 0 | 1 | 0 | 0 | 3 | 3 | 0 | 1 | 0 | 0 | 2 | 9 | 1 | (1) |
| 2-bromo-N-tert-butyl-2'-methoxyacetanilide. | 5 | 3 | 0 | 0 | 3 | 3 | 2 | 0 | 0 | 3 | 3 | 3 | 0 | 0 | 0 | 1 | 15 | 3 | (1) |

*One species missing.    (1) Surface application.    (2) Incorporated in soil.

The data in Table I illustrates the general herbicidal activity as well as the selective herbicidal activity of some of the N-substituted ortho-substituted alpha-haloacetanilides of this invention. It will be noted that haloacetanilides substituted with an alkyl group on the amide nitrogen atom and a substituent other than tertiary alkyl ortho to the amide nitrogen atom demonstrate very outstanding general herbicidal activity at low rates of application. Thus, these alpha-haloacetanilides are particularly useful in soil sterilization applications. It will also be noted from the data in Table I that unusual grass specificity can be obtained at lower levels of application. Such grass specificity is achieved at extremely low application rates, for example, at rates as low as 0.05 lb. per acre with 2-chloro-N,2'-dimethylacetanilide, so that very economical treatment is possible. The three botanical types or genera can be removed from corn, which is also a genus of grass. These alpha-haloacetanilides are also effective in killing nut grass, i.e., *Cyperus rotundus* and *Cyperus esculentus*.

EXAMPLE 16

In this example, the lack of herbicidal activity of closely related compounds which do not have the structure of the N-substituted ortho-substituted alpha-haloacetanilides of this invention is demonstrated. Pre-emergent greenhouse tests were used in this example and the planting of the seeds was accomplished in the same manner as described in Example 15. The data obtained are reported in Table II wherein the identification of the seeds is the same as that in the previous example and the herbicidal ratings given also have the same definition.

Table II

COMPARISON OF PRE-EMERGENCE HERBICIDAL ACTIVITY OF VARIOUS ALPHA-HALOACETANILIDES

| Compound | A | B | C | D | E | F | G | H | I | J | K | L | M | N | O | Grass | Broadleaf | Comments |
|---|---|---|---|---|---|---|---|---|---|---|---|---|---|---|---|---|---|---|
| N-tert-butyl-2-chloro-2'-methylacetanilide | 3 | 3 | 3 | 3 | 3 | 3 | 2 | 2 | 3 | 3 | 3 | 2 | | 3 | 3 | 18 | *15 | At 5 lb./acre. |
| N,2'-di-tert-butyl-2-chloroacetanilide | 0 | 0 | 0 | 0 | 0 | 0 | 0 | 0 | 0 | 0 | 0 | 0 | 0 | 0 | 0 | 0 | 0 | Do. |
| 2-chloro-2'-methyl-N-(1-methylpropyl)acetanilide | 2 | 1 | 0 | 0 | 0 | 3 | 0 | 0 | 3 | 3 | 3 | 0 | 3 | 0 | 0 | 9 | 6 | Do. |
| 2'-tert-butyl-2-chloro-N-(1-methylpropyl)acetanilide | 0 | 0 | 0 | 0 | 0 | 2 | 0 | 0 | 0 | 2 | 0 | | 0 | 0 | 0 | 4 | *0 | Do. |
| 2-chloro-N,2'-dimethylacetanilide | 3 | 0 | 0 | 3 | 3 | 3 | 0 | 0 | 3 | 2 | 0 | 0 | 0 | 0 | 0 | 14 | 0 | At 0.05 lb./acre. |
| 2-chloro-N,3'-dimethylacetanilide | 0 | 0 | 0 | 0 | 2 | 0 | 0 | 0 | 0 | 0 | 0 | 0 | 0 | 0 | 0 | 2 | 0 | Do. |
| 2-chloro-N,4'-dimethylacetanilide | 0 | 0 | 0 | 0 | 0 | 0 | 0 | 0 | 0 | 0 | 0 | 0 | 0 | 0 | 0 | 0 | 0 | Do. |
| N-tert-butyl-2-chloro-2'-methylacetanilide | 3 | 2 | 3 | 0 | 3 | 3 | 1 | 2 | 3 | 3 | 3 | 2 | 1 | 2 | 3 | 15 | 14 | At 1 lb./acre. |
| N-tert-butyl-2-chloro-4'-methylacetanilide | 2 | 1 | 2 | 0 | 3 | 3 | 0 | 0 | 0 | 0 | 0 | 0 | 0 | 0 | 2 | 8 | 2 | Do. |
| 2-chloro-2'-isopropyl-N-methylacetanilide | 2 | 0 | 0 | 0 | 2 | 3 | 0 | 0 | 3 | 3 | 0 | 0 | 0 | 0 | 0 | 11 | 0 | At 0.25 lb./acre. |
| 2-chloro-2'-isopropyl-6'-methylacetanilide | 1 | 0 | 0 | 0 | 0 | 0 | 0 | 0 | 2 | 3 | 2 | 0 | 0 | 0 | 0 | 5 | 2 | Do. |
| N-tert-butyl-2-chloro-2'-methylacetanilide | 3 | 3 | 3 | 3 | 3 | 3 | 2 | 2 | 3 | 3 | 3 | 2 | | 3 | 3 | 18 | *15 | At 5 lb./acre. |
| 4'-tert-butyl-2-chloro-2'-methylacetanilide | 0 | 0 | 0 | 0 | 0 | 0 | 0 | 0 | 0 | 0 | 0 | 0 | 0 | 0 | 0 | 0 | 0 | Do. |
| N-tert-butyl-2-chloro-2'-methylacetanilide | 3 | 3 | 3 | 3 | 3 | 3 | 2 | 2 | 3 | 3 | 3 | 2 | | 3 | 3 | 18 | *15 | Do. |
| 2'-tert-butyl-2-chloro-4'-methylacetanilide | 0 | 0 | 0 | 0 | 0 | 0 | 0 | 0 | 0 | 0 | 0 | 0 | 0 | 0 | 0 | 0 | 0 | Do. |
| N-tert-butyl-2-chloro-2'-methylacetanilide | 3 | 3 | 3 | 3 | 3 | 3 | 3 | 3 | 3 | 3 | 3 | 2 | 3 | 3 | 3 | 18 | 20 | At 25 lb./acre. |
| N,4'-di-tert-butyl-2-chloroacetanilide | 0 | 0 | 0 | 0 | 0 | 0 | 0 | 0 | 0 | 0 | 0 | 0 | 0 | 0 | 0 | 0 | 0 | Do. |
| 2-chloro-N,2'-dimethylacetanilide | 3 | 0 | 0 | 3 | 3 | 3 | 0 | 0 | 3 | 3 | 2 | 0 | 0 | 0 | 2 | 17 | 2 | At 1 lb./acre. |
| 4'-tert-butyl-2-chloro-N-methylacetanilide | 0 | 0 | 0 | 0 | 0 | 0 | 0 | 0 | 0 | 0 | 0 | 0 | 0 | 0 | 0 | 0 | 0 | Do. |
| 2-chloro-2'-methyl-N-(1-methylpropyl)acetanilide | 2 | 1 | 0 | 0 | 0 | 3 | 0 | 0 | 3 | 3 | 3 | 0 | 3 | 0 | 0 | 9 | 6 | At 5 lb./acre. |
| 4'-tert-butyl-2-chloro-2'-methyl-N-(1-methylpropyl)acetanilide | 0 | 0 | 2 | 0 | 0 | 0 | 0 | 0 | 0 | 0 | 0 | 0 | 0 | 0 | 0 | 0 | 2 | Do. |
| 2-chloro-N-ethyl-2'-methylacetanilide | 3 | 0 | 0 | 3 | 3 | 3 | 0 | 1 | 3 | 3 | 3 | 0 | 0 | 1 | 3 | 18 | 5 | Do. |
| 4'-tert-butyl-2-chloro-N-ethyl-2'-methylacetanilide | 1 | 0 | 0 | 0 | 0 | 0 | 0 | 0 | 3 | 2 | 0 | 0 | 0 | 0 | 0 | 5 | 0 | Do. |
| N-tert-butyl-2-chloro-2'-methylacetanilide | 3 | 2 | 3 | 0 | 3 | 3 | 1 | 2 | 3 | 3 | 3 | 2 | 1 | 2 | 3 | 15 | 14 | At 1 lb./acre. |
| 2-bromo-N-tert-butyl-2'-methylacetanilide | 0 | 0 | 0 | 0 | 0 | 0 | 0 | 0 | 1 | 2 | 0 | 0 | 0 | 0 | 0 | 3 | 0 | Do. |
| N-tert-butyl-2-chloro-2'-ethylacetanilide | 2 | 0 | 1 | 0 | 1 | 3 | 0 | 1 | 3 | 2 | 2 | 0 | | 0 | 1 | 10 | *4 | Do. |
| 2-bromo-N-tert-butyl-2'-ethylacetanilide | 0 | 0 | 0 | 0 | 0 | 0 | 0 | 0 | 0 | 0 | 0 | 0 | 0 | 0 | 0 | 0 | 0 | Do. |
| N-tert-butyl-2-chloro-2'-methoxyacetanilide | 3 | 1 | 3 | 3 | 1 | 3 | 0 | 0 | 3 | 3 | 3 | 1 | 0 | 0 | 3 | 16 | 7 | At 5 lb./acre. |
| 2-bromo-N-tert-butyl-2'-methoxyacetanilide | 3 | 0 | 0 | 3 | 3 | 2 | 0 | 0 | 3 | 3 | 3 | 0 | 0 | 0 | 1 | 15 | 3 | Do. |
| N-tert-butyl-2-iodo-2'-methoxyacetanilide | 1 | 1 | 3 | 0 | 0 | 1 | 0 | 0 | 3 | 2 | 3 | 0 | 0 | 1 | 1 | 7 | 7 | Do. |

*One species missing.

The first comparison reported in Table II shows the critical nature of the ortho substituents of acetanilides both N-substituted and ortho-substituted. N-tert-butyl-2-chloro-2'-methylacetanilide, an acetanilide of this invention, has very severe phytotoxicity at an application rate of 5 lb./acre but upon changing the ortho substituent from a methyl group to a tert-butyl group, N,2'-di-tert-butyl-2-chloroacetanilide, the herbicidal activity rating becomes 0 at the same application rate. Similarly, the herbicidal activity of the ortho methyl group, e.g., 2-chloro-2'-methyl-N-(1-methylpropyl)acetanilide, was very outstanding at 5 lb./acre, but the activity of the similar acetanilide having an ortho tert-butyl group instead of an ortho methyl group, 2'-tert-butyl-2-chloro-N-(1-methylpropyl)acetanilide, had almost no herbicidal activity at the same rate of application.

In the second comparison in Table II, the detrimental effect on herbicidal activity resulting from transferring the ortho alkyl group of an acetanilide of this invention to another position on the aromatic ring is demonstrated. Thus, 2-chloro-N,2'-dimethyl acetanilide, which has a methyl group in an ortho position, has very outstanding herbicidal activity at an application rate of 0.05 lb./acre, but 2-chloro-N,3'-dimethylacetanilide, which has the ortho methyl group substituted in a meta position, has almost no herbicidal activity at the same application rate and 2-chloro-N,4'-dimethylacetanilide, which has the ortho methyl group substituted in the para position, has no herbicidal activity at the same rate of application. Similarly, the herbicidal activity of N-tert-butyl-2-chloro-2'-methylacetanilide is severely reduced at an application rate of 1 lb./acre by substituting the ortho methyl group in the para position.

The effect on herbicidal activity resulting from removing the N-alkyl group from the acetanilide of this invention and substituting that alkyl group on the aromatic ring is shown in the third comparison reported in Table II. Thus, removing the methyl group from 2-chloro-2'-isopropyl-N-methylacetanilide, an acetanilide of this invention, and substituting the same in an ortho position, as in 2-chloro-2'-isopropyl-6'-methylacetanilide, results in a severe reduction in herbicidal activity at an application rate of 0.25 lb./acre. Similarly, removing the N-tert-butyl group from N-tert-butyl-2-chloro-2'-methylacetanilide and substituting it in the para position of 4'-tert-butyl-2-chloro-2'-methylacetanilide results in the acetanilide having no herbicidal activity at an application rate of 5 lb./acre.

In the fourth comparison reported in Table II, the N-substituent is substituted in an ortho position and the ortho-substituent is placed in the para position. However, the herbicidal activity of the acetanilide thus formed, 2'-tert-butyl-2-chloro-4'-methylacetanilide, is non-existent at an application of 5 lb./acre whereas the related N-tert-butyl-2-chloro-2'-methylacetanilide of this invention has severe phytotoxicity at the same rate of application.

The fifth comparison reported in Table II shows that removing a primary ortho alkyl substituent and substituting a tertiary alkyl in the para position on the aromatic ring completely destroys the herbicidal activity of the acetanilide. For example, N-tert-butyl-2-chloro-2'-methylacetanilide, and acetanilide of this invention, has severe phytotoxicity at an application rate of 25 lb./acre whereas N,4'-di-tert-butyl-2-chloroacetanilide, which has no ortho substituent but there is a tert-butyl group in the para position, has no herbicidal activity at the same application rate. Also, 2-chloro-N,2'-dimethylacetanilide is a very good herbicide at an application rate of 1 lb./acre but 4'-tert-butyl-2-chloro-N-methylacetanilide, which has no ortho methyl group but which has a tert-butyl group in the para position, has no herbicidal activity at the same application rate.

The sixth comparison reported in Table II demonstrates that the addition of a tert-butyl group on the aromatic ring of an acetanilide of this invention destroys the herbicidal activity of the acetanilide. Thus, 2-chloro-2'-methyl-N-(1-methylpropyl)acetanilide and 2-chloro-N-ethyl-2'-methylacetanilide, acetanilides of this invention, have very outstanding herbicidal activity at an application rate of 5 lb./acre but 4'-tert-butyl-2'-methyl-N-(1-methylpropyl) acetanilide and 4'-tert-butyl-2-chloro-N-ethyl-2'-methylacetanilide, which are acetanilides having a tert-butyl group in the para position, have almost no herbicidal activity at the same rate of application.

In the next comparison reported in Table II, the effect of the nature of the alpha-halo group is demonstrated. For example, acetanilides having ortho alkyl substituents and alpha-chloro groups, e.g., N-tert-butyl-2-chloro-2'-methylacetanilide and N-tert-butyl-2-chloro-2'-ethylacetanilide, have outstanding herbicidal activity but the same acetanilide having an alpha-bromo group instead of an alpha-chloro group has no herbicidal activity at the same rate of application.

The last comparison reported in Table II shows that alkoxy-substituted acetanilides having either an alpha-chloro or an alpha-bromo group are active herbicides but the similar acetanilide having an alpha-iodo group is inactive at the same rate of application. Thus, N-tert-butyl-2-chloro-2'-methoxyacetanilide and 2-bromo-N-tert-butyl-2'-methoxyacetanilide have herbicidal activity at an application rate of 5 lb./acre but N-tert-butyl-2-iodo-2'-methoxyacetanilide has no herbicidal activity.

The data in this example very clearly demonstrate the critical effect on herbicidal activity of the nature of the nuclear-substituted alkyl groups, their location with respect to the nitrogen atom, and the nature of the alpha-halo group. In order to have very high unit activities and wide plant spectrums, the alpha-haloacetanilide must be one which has a non-tertiary alkyl substituent ortho with respect to the amide nitrogen atom, an alkyl group on the amide nitrogen atom, and no other substitutions on the aromatic ring.

EXAMPLE 17

In this example, the contact herbicidal activity of some of the N-substituted ortho-substituted alpha-haloacetanilides of this invention was determined in greenhouse tests. The alpha-haloacetanilide to be tested was applied in spray form to 21-day old specimens of the same grasses and broadleaf plants as used in the pre-emergent tests described in Example 15. The same number of seeds of the same plants used in Example 15 were planted in the 9½" x 5¾" x 2¾" aluminum pans arranged in the same manner with a soybean seed in diagonal corners as described in Example 15. After the plants were 21-days old each aluminum pan was sprayed with 6 ml. of a 0.5% concentration solution of the candidate chemical, corresponding to a rate of approximately 9 lbs. per acre. This herbicidal solution was prepared from 1.5 ml. of a 2% solution of the candidate compound in acetone, 0.2 ml. of a 3:1 cyclohexanone-emulsifying agent mix, and sufficient water to make a volume of 6 ml. The emulsifying agent was a mixture comprising 35 weight percent butylamine dodecylbenzene sulfonate and 65 weight percent of a tall oil-ethylene oxide condensate having about 6 moles of ethylene oxide per mole of tall oil. The injuries to the plants were then observed 14 days later and are reported in Table III. The herbicidal ratings recorded in Table III have the same meaning as stated in Example 15.

Table III

CONTACT HERBICIDAL ACTIVITY OF CERTAIN ORTHO-SUBSTITUTED ALPHA-HALOACETANILIDES

| Compound | General Grass | General Broadleaf |
| --- | --- | --- |
| N-tert-butyl-2-chloro-2'-methylacetanilide | 1 | 1 |
| 2-chloro-N,2'-di-(1-methylpropyl)acetanilide | 1 | 1 |
| N-tert-butyl-2-chloro-2'-ethylacetanilide | 0 | 1 |
| 2-chloro-N-isopropyl-2'-methylacetanilide | 3 | 1 |
| 2-chloro-2'-methyl-N-(1-methylpropyl) acetanilide | 1 | 1 |
| 2-chloro-2'-isopropyl-N-methylacetanilide | 0 | 1 |
| 2-chloro-N-ethyl-2'-methylacetanilide | 0 | 2 |
| 2-chloro-N,2'-dimethylacetanilide | 1 | 1 |
| 2-bromo-N,2'-dimethylacetanilide | 1 | 4 |
| N-tert-butyl-2-chloro-2'-methoxyacetanilide | 0 | 1 |
| 2-bromo-N-tert-butyl-2'-methoxyacetanilide | 0 | 3 |

EXAMPLE 18

In this example, the pre-emergence activity of certain N-substituted ortho-substituted alpha-haloacetanilides was determined in a field test. For this test, the following liquid concentrate compositions were prepared:

CONCENTRATE COMPOSITION A HAVING SOLUTION TEMPERATURE OF +2° C. AND CONTAINING 3 LB./GAL. ACTIVE INGREDIENT

| | Wt. percent |
| --- | --- |
| 2-chloro-N,2'-dimethylacetanilide | 37.69 |
| Xylene | 57.31 |
| Surface active agent A [1] | 4.00 |
| Surface active agent B [1] | 1.00 |
| | 100.00 |

[1] Surface active agents A and B are non-ionic and ionic blends of surface active agents of alkyl-phenol-ethylene oxide condensate plus an alkylarylsulfonate available from Witco Chemical Company and identified as Emcol AD-17-27A and Emcol AD-18-11C, respectively.

CONCENTRATE COMPOSITION B HAVING SOLUTION TEMPERATURE OF +4° C. AND CONTAINING 4 LB./GAL. ACTIVE INGREDIENT

| | Wt. percent |
| --- | --- |
| N - tert - butyl - 2 - chloro - 2' - methylacetanilide (95% pure) | 51.47 |
| Xylene | 43.53 |
| Surface active agent C [2] | 2.50 |
| Surface active agent D [3] | 2.50 |
| | 100.00 |

[2] Surface active agent C is a non-ionic surface active agent comprising a fatty acid-ethylene oxide condensate available from Geigy Chemical Company and identified as Alrodyne 6104.
[3] Surface active agent D is a non-ionic and ionic blend of surface active agents of a long-chain alkylphenol-ethylene oxide condensate (5–15 moles) and an alkylarylsulfonate available from Antara Chemicals Company as Antarate 9181.

Certain crop plants and weed plants (listed in Table IV) were planted in 100-ft. rows one foot apart at Hazelwood, Missouri, in the spring. The emulsifiable concentrate was applied the day following the planting parallel to the rows at a decreasing logarithmic rate starting at 6 lbs./acre at one end of the rows and decreasing to 0.015 lb./acre at the other end of the rows. Water was used as the carrier in applying the concentrate. The plants were inspected approximately 3 weeks and 6 weeks after planting to pinpoint the minimum rates at which slight injury and complete kill occurred. The data obtained are reported in Table IV.

Table IV
PRE-EMERGENCE FIELD TESTS OF CERTAIN N-SUBSTITUTED ORTHO-SUBSTITUTED ALPHA-HALOACETANILIDES

|  | Concentrate Composition B | | Concentrate Composition A | |
|---|---|---|---|---|
|  | Rate for Complete Kill, lb./acre | Rate for Slight Injury, lb./acre | Rate for Complete Kill, lb./acre | Rate for Slight Injury, lb./acre |
| Crops: | | | | |
| Cantaloupe | *6 | 5.7 | *6 | 4.0 |
| Tomato | 5.5 | 1.8 | *6 | 1.7 |
| Cotton | *6 | 4.1 | *6 | 5.5 |
| Flax | *6 | 5.3 | *6 | 5.3 |
| Soybean | *6 | 3.3 | *6 | 1.8 |
| Snapbean | *6 | 1.14 | *6 | 5.5 |
| Peas | *6 | 5.3 |  | *6 |
| Alfalfa | *6 | 0.72 | *6 | 1.8 |
| Radish |  |  | *6 | 5.5 |
| Sugarbeet | *6 | 4.1 | 5.4 | 1.55 |
| Corn |  | *6 |  | *6 |
| Oats | *6 | 2.9 | *6 | 2.9 |
| Barley | *6 | 5 | *6 | 2.75 |
| Weeds: | | | | |
| Horsenettle | *6 | 2.5 |  |  |
| Pigweed | 5.7 | 0.15 | 5.5 | 0.7 |
| Lamb's-quarter | *6 | 3.3 |  |  |
| Smartweed | *6 | 3.9 | *6 | 3.9 |
| Johnson Grass | *6 | 1.8 |  | *6 |
| Barnyard Grass | 0.72 | 0.17 | 5.4 | 0.77 |
| Crabgrass | 4.7 | 0.56 | 2.2 | 0.65 |
| Brome | 2.8 | 0.85 | 1.45 | 0.28 |

*Means greater than 6.

The herbicidal compositions of this invention are either particulate solid (i.e., dusts) or liquid concentrate compositions comprising the active ingredient and either a particulate solid or liquid herbicidal adjuvant which are formulation aids or conditioning agents permitting the concentrate composition to be readily mixed with a suitable solid or liquid carrier in the field for application of the active ingredient on soil or plant surfaces in a toxic concentration in a form which enables prompt assimilation by the germinating seeds, emerging seedlings, or full grown plants. Thus, the herbicidal compositions of this invention include not only the concentrate compositions comprising the active ingredient and the herbicidal adjuvant but also herbicidal toxicant compositions applied in the field comprising the concentrate composition (i.e., active ingredient plus herbicidal adjuvant) and the carrier.

As demonstrated in the examples above, quite different effects can be obtained by modifying the method of use of the herbicidal composition of this invention. Thus, unusual grass specificity can be achieved at lower levels of application whereas at higher levels of application a more general herbicidal effect or soil sterilization takes place. Therefore, an essential part of this invention is the formulation of the herbicidal composition so as to permit a uniform predetermined application of the composition to the plant environment to produce the desired effect.

Herbicidal adjuvants useful in preparing the concentrate compositions and, therefore, the herbicidal toxicant compositions applied to the soil or plants, include particulate solid or liquid extending agents such as solvents or diluents within which the active ingredient is dissolved or suspended, wetting or emulsifying agents which serve in providing uniform dispersions or solutions of the active ingredient in the extending agents, and adhesive agents or spreading agents which improve the contact of the active ingredient with the soil or plant surfaces. All herbicidal compositions of this invention include at least one of the above types of herbicidal adjuvants and usually include an extending agent and a wetting or emulsifying agent because of the nature of the physical properties of the alpha-haloacetanilides of this invention.

In general, the N-substituted ortho-substituted alpha-haloacetanilides of this invention are insoluble in water and are not readily soluble in many organic solvents. Therefore, the choice of a liquid extending agent is somewhat limited if it is desired that the active ingredient be in solution in the extending agent. The active ingredient need not be dissolved in the extending agent but may merely be dispersed or suspended in the extending agent as a suspension or emulsion. Also, the alpha-haloacetanilides may first be dissolved in a suitable organic solvent and the organic solution of the active ingredient then incorporated in water or an aqueous extending agent to form a heterogeneous dispersion. Examples of some suitable organic solvents for use as extending agents include hexane, benzene, toluene, acetone, cyclohexanone, methylethylketone, isopropanol, butanediol, methanol, diacetone alcohol, xylene, dioxane, isopropyl ether, ethylene dichloride, tetrachloroethane, hydrogenated naphthalene, solvent naphtha, petroleum fractions (e.g., those boiling almost entirely under 400° F. at atmospheric pressure and having flash points above about 80° F., particularly kerosene), and the like. Where true solutions are desired, mixtures of organic solvents have been found to be useful, for example, 1:1 and 1:2 mixtures of xylene and cyclohexanone.

Solid extending agents in the form of particulate solids are very useful in the practice of the present invention because of the low solubility properties of the alpha-haloacetanilides of this invention. In using this type of extending agent, the active ingredient is either adsorbed or dispersed on or in the finely divided solid material. Preferably the solid extending agents are not hygroscopic but are materials which render the composition permanently dry and free flowing. Suitable solid extending agents include the natural clays, such as china clays, the bentonites and the attapulgites; other minerals in natural state, such as talc, pyrophyllite, quartz, diatomaceous earth, fuller's earth, chalk, rock phosphate, kaolin, kieselguhr, volcanic ash, salt, and sulfur; the chemically modified minerals, such as acid-washed bentonite, precipitated calcium phosphate, precipitated calcium carbonate, calcined magnesia, and colloidal silica; and other solid materials such as powdered cork, powdered wood, and powdered pecan or walnut shells. These materials are used in finely-divided form, at least in a size range of 20–40 mesh and preferably in much finer size.

The particulate solid concentrate compositions are applied to the soil by admixture at the time of application with a particulate solid carrier material. If desired, this concentrate composition can also be applied as a wettable powder using a liquid carrier material. When used by this method, a wetting agent or surface active agent is added to the concentrate composition in order to render the particulate solid extending agent wettable by water to obtain a stable aqueous dispersion or suspension suitable for use as a spray. Also, the extending agent applied as a wettable powder is used in very finely-divided form, preferably in a size as small as 100 mesh or smaller.

The surface active agent, that is the wetting, emulsifying, or dispersion agent, used in the herbicidal composition of this invention to serve in providing uniform dispersions of all formulation components of both liquid and dust types in both the concentrate compositions and the toxicant compositions applied, may be either anionic, cationic, or non-ionic types, including mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acids; the sulfonated animal, vegetable, and mineral oils; quaternary salts of high molecular weight acids; rosin soaps, such as salts of abietic acid; sulfuric acid salts of high molecular weight organic compounds; algin soaps; ethylene oxide condensated with fatty acids, alkyl phenols and mercaptans; and other simple and polymeric compositions having both hydrophilic and hydrophobic functions.

The herbicidal concentrate compositions of this invention ordinarily have the active ingredient and the surface active agent present in higher concentrations than the toxicant compositions applied in the field so that upon dilution with the liquid or solid carrier, compositions containing optimum proportions of active ingredient and surface active agent are prepared to obtain uniform distribution and to maintain the active ingredient in a form which enables the prompt assimilation by the plant.

The liquid concentrate compositions of this invention preferably comprise 5% to 95% by weight of the active ingredient and the remainder the herbicidal adjuvant, which may be solely liquid extending agent or surface active agent (including adhesive agent), but preferably is a combination of liquid extending agent and surface active agent. Preferably, the surface active agent comprises from 0.1% to 15% by weight of the total concentrate composition. The remainder of the composition is the liquid extending agent.

Use of the surface active agent is necessary in the formulation of liquid concentrate compositions in order to obtain a composition containing a sufficient concentration of the difficultly soluble alpha-haloacetanilide in the liquid extending agent. However, the liquid extending agent must be selected not only on the basis of the amount of the alpha-haloacetanilide dissolved but also upon the basis of the solution temperature of the total composition. Thus, in some formulations, a particular combination of solvents give a sufficiently low solvent temperature but the amount of the alpha-haloacetanilide dissolved or dispersed in the mixture is insufficient and a suitable surface active agent must be selected in order that more alpha-haloacetanilide can be dispersed in the composition. Preferably, the concentrate composition has a solution temperature below 0° C. although compositions having solution temperatures as high as 20° C. can be used.

The concentration of alpha-haloacetanilide in the particulate solid or dust concentrate composition of this invention may vary over wide ranges depending upon the nature of the solid extending agent and the intended use of the composition. Since the alpha-haloacetanilides of this invention have very high toxicities and are applied at very low rates in order to obtain selectivity, the concentration of the active ingredient in the dust composition may be very low and may comprise as little as 1% or less by weight of the total dust composition. By contrast, when the dust composition is to be used for soil sterilization, it may be desirable to have a very high concentration of active ingredient and for such use the active ingredient may comprise as much as 5% to 98% by weight of the total composition. The remainder of the composition is the herbicidal adjuvant which is usually only the particulate solid extending agent. Thus, the surface active agent is not usually required in dust concentrate compositions although it can be used if desired. However, if the dust concentrate is to be applied as a wettable powder, surface active agent must be added to the concentrate composition and ordinarily the amount of surface active agent will be in the range of 0.1% to 15% by weight of the composition.

The carrier material, used for the uniform distribution of the alpha-haloacetanilide in an herbicidally effective amount to inhibit the growth of either all or selected plants, may be either a liquid or a particulate solid material. The liquid and solid extending agents used to prepare the concentrate composition may also be used as the carrier; however, the use of these materials as a carrier is often not economical. Therefore, water is the preferred liquid carrier, both for use with the liquid concentrate composition and the wettable powder concentrate. Suitable particulate solid carriers include the particulate extending agents noted above as well as the solid fertilizers such as ammonium nitrate, urea, and superphosphate, as well as other materials in which plant organisms may take root and grow, such as compost, manure, humus, sand and the like.

The liquid and dust concentrate compositions of this invention can also contain other additaments such as fertilizer and pesticides. Also, these additaments may be used as, or in combination with, the carrier materials.

The herbicidal compositions of this invention are applied to the plant systems in the conventional manner. Thus, the dust and liquid compositions may be applied to the foliage of growing plants by the use of power-dusters, boom and hand sprayers, and spray-dusters. The compositions can also be very suitably applied from airplanes as a dust or a spray because the herbicidal compositions of this invention are effective in very low dosages. In order to prevent growth of germinating seeds or emerging seedlings, the dust and liquid compositions are applied to the soil according to conventional methods, and, preferably, distributed in the soil to a depth of at least ½-inch below the soil surface. It is not absolutely necessary that the herbicidal compositions be admixed with the soil particles and these compositions can be applied merely by spraying or sprinkling onto the surface of the soil. The herbicidal compositions of this invention can also be applied by addition to irrigation water supplied to the field to be treated. This method of application permits the penetration of the compositions into the soil as the water is absorbed therein. Dust compositions sprinkled on the surface of the soil can be distributed below the surface of the soil by the usual discing, dragging, or mixing operations.

The application of a growth-inhibiting amount or toxic amount of the alpha-haloacetanilide to the plant system is essential in the practice of the present invention. The exact dosage to be applied is dependent not only upon the specific alpha-haloacetanilide but also upon the particular plant species to be controlled and the stage of growth thereof as well as the part of the plant to be contacted with the toxicant. In non-selective foliage treatments, the herbicidal compositions of this invention are usually applied at a range sufficient to obtain from 5 to 50 lbs. of alpha-haloacetanilide per acre but lower or higher rates might be applied in some cases. In non-selective pre-emergent treatments, these herbicidal compositions are usually applied at a somewhat lower rate than in foliage treatments but at a rate which is ordinarily within the same general range; that is, at a rate in the range of 1 to 25 lbs. per acre. However, because of the unusually high unit activity possessed by the alpha-haloacetanilides of this invention, soil sterilization is ordinarily accomplished at a rate of application in the range of 3–9 lbs. per acre. In selective pre-emergent applications to the soil, a dosage of from 0.05 to 5 lbs. of active ingredient per acre is usually employed but lower or higher rates may be necessary in some instances. It is believed that one skilled in the art can readily determine from this disclosure, including the examples, the optimum rate to be applied in any particular case.

Although the active ingredient in the herbicidal compositions of this invention is preferably a N-substituted ortho-substituted alpha-haloacetanilide as described in this specification, other alpha-haloacetanilides having other nuclear alkyl substitution and/or halo substitution and/or having no amide nitrogen substitution may also be present in the herbicidal compositions and contribute to the activity of the composition. However, the essential active ingredient of the herbicidal compositions of this invention is the N-substituted ortho-substituted alpha-haloacetanilide disclosed in this specification. Of course, one skilled in the art will understand that mixtures of various N-substituted ortho-substituted alpha-haloacetanilides can also be used.

Reasonable variation and modification of the invention as described are possible, the essence of which is that there have been provided (1) herbicidal concentrate compositions comprising a herbicidal adjuvant and, as an essential active ingredient, a N-substituted ortho-substituted alpha-haloacetanilide, (2) herbicidal toxicant compositions comprising a herbicidal adjuvant, a carrier, and, as an essential active ingredient, a toxic or growth-inhibiting amount of a N-substituted ortho-substituted alpha-haloacetanilide, (3) methods for suppression and control of undesirbale vegetation, including full grown plants as well as germinating seeds and emerging seedlings, by the application of a N-substituted ortho-substituted alpha-haloacetanilide thereto, and (4) certain N-substituted ortho-substituted alpha-haloacetanilides as new compounds.

I claim:
1. An α-haloacetanilide of the formula

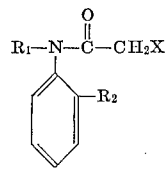

wherein $R_1$ is alkyl of not more than 6 carbon atoms, $R_2$ is alkoxy of not more than 4 carbon atoms, and X is a halogen atom selected from the group consisting of chlorine and bromine.

2. N-tert-butyl-2-chloro-2'-methoxyacetanilide.
3. 2-bromo-N-tert-butyl-2'-methoxyacetanilide.

References Cited by the Examiner
UNITED STATES PATENTS

| | | | |
|---|---|---|---|
| 2,695,840 | 11/1954 | Leppla | 71—2.6 |
| 2,726,947 | 12/1955 | Baumgart | 71—2.6 |
| 2,863,752 | 12/1958 | Hamm et al. | 260—562 |
| 2,912,438 | 11/1959 | Oxley et al. | 260—562 |
| 2,948,763 | 8/1960 | Martin | 260—562 |
| 3,012,073 | 12/1961 | Gregory | 260—562 |
| 3,121,114 | 2/1964 | Keller et al. | 260—562 |

OTHER REFERENCES

Clark et al.: Biochem. Jour., vol. 55, pages 839–851 (1953).

Leonard et al.: Jour. Bacteriology, vol. 57, pages 339–349 (1949).

Republic of South Africa patent application No. 21,876 filed October 12, 1954, published July 24, 1958, pages 1–6 relied on.

WALTER A. MODANCE, *Primary Examiner.*
JOHN D. RANDOLPH, *Examiner.*
NATALIE TROUSOF, *Assistant Examiner.*